United States Patent
Li et al.

(10) Patent No.: US 10,175,969 B2
(45) Date of Patent: Jan. 8, 2019

(54) DATA PROCESSING FOR UPGRADING MEDICAL EQUIPMENT

(71) Applicant: Shenyang Neusoft Medical Systems Co., Ltd., Shenyang (CN)

(72) Inventors: Shuangxue Li, Shenyang (CN); Qingxiang Shu, Shenyang (CN)

(73) Assignee: SHENYANG NEUSOFT MEDICAL SYSTEMS CO., LTD., Shenyang (CN)

(*) Notice: Subject to any disclaimer, the term of this patent is extended or adjusted under 35 U.S.C. 154(b) by 49 days.

(21) Appl. No.: 14/983,622

(22) Filed: Dec. 30, 2015

(65) Prior Publication Data
US 2016/0188318 A1 Jun. 30, 2016

(30) Foreign Application Priority Data
Dec. 30, 2014 (CN) .......................... 2014 1 0843341

(51) Int. Cl.
*G06F 8/65* (2018.01)
*H04L 29/08* (2006.01)

(52) U.S. Cl.
CPC .............. *G06F 8/65* (2013.01); *H04L 67/125* (2013.01); *H04L 67/34* (2013.01)

(58) Field of Classification Search
CPC ..... G06F 8/60; G06F 8/61; G06F 8/65; G06F 8/70; G06F 8/71; H04L 67/34; H04L 67/125
USPC .................................................. 717/168–178
See application file for complete search history.

(56) References Cited

U.S. PATENT DOCUMENTS

| | | | |
|---|---|---|---|
| 7,130,701 B1* | 10/2006 | Wischinski | G05B 19/042 700/108 |
| 7,278,131 B2* | 10/2007 | Gunyakti | G06F 21/121 717/107 |
| 2004/0068721 A1 | 4/2004 | O'Neill et al. | |
| 2007/0118617 A1 | 5/2007 | Lee et al. | |
| 2008/0065549 A1 | 3/2008 | Hirata | |
| 2008/0167860 A1* | 7/2008 | Goller | G10L 15/28 704/201 |
| 2009/0119325 A1* | 5/2009 | Petri | G06F 17/30911 |
| 2009/0205037 A1 | 8/2009 | Asakura | |
| 2010/0138526 A1* | 6/2010 | Dehaan | H04L 41/0806 709/223 |

(Continued)

FOREIGN PATENT DOCUMENTS

| | | |
|---|---|---|
| CN | 101106480 A | 1/2008 |
| CN | 201167330 Y | 12/2008 |

(Continued)

*Primary Examiner* — Andrew M. Lyons
(74) *Attorney, Agent, or Firm* — Kilpatrick Townsend & Stockton LLP

(57) ABSTRACT

A method for upgrading medical equipment is disclosed. The method may include: according to a first target upgrading identification in a software upgrading package, determining a first target equipment number corresponding to the first target upgrading identification. The table of upgrading identifications can include association between upgrading identifications and equipment numbers of the medical equipment. The method further includes sending the software upgrading package to a first target medical equipment corresponding to the first target equipment number to allow the first target medical equipment to upgrade itself according to the software upgrading package.

6 Claims, 9 Drawing Sheets

(56) References Cited

U.S. PATENT DOCUMENTS

| | | | |
|---|---|---|---|
| 2010/0217843 A1* | 8/2010 | Dehaan | G06F 8/65 709/221 |
| 2011/0099543 A1* | 4/2011 | Thorley | G06F 8/71 717/168 |
| 2011/0289497 A1* | 11/2011 | Kiaie | G06F 8/65 717/171 |
| 2012/0036552 A1* | 2/2012 | Dare | H04L 41/0253 726/1 |
| 2012/0079471 A1* | 3/2012 | Vidal | G06F 8/65 717/169 |
| 2012/0106440 A1* | 5/2012 | Moses | H04L 63/0876 370/328 |
| 2012/0239739 A1* | 9/2012 | Manglik | G06F 9/5077 709/203 |
| 2012/0331526 A1* | 12/2012 | Caudle | G06F 21/6209 726/4 |
| 2013/0019233 A1* | 1/2013 | Pardehpoosh | G06F 21/121 717/170 |
| 2013/0036412 A1* | 2/2013 | Birtwhistle | G06F 19/3412 717/171 |
| 2013/0036414 A1* | 2/2013 | Birtwhistle | G06F 8/60 717/173 |
| 2013/0036415 A1* | 2/2013 | Birtwhistle | G06F 8/65 717/173 |
| 2013/0054960 A1* | 2/2013 | Grab | G06F 21/10 713/155 |
| 2013/0253600 A1* | 9/2013 | Drew | G06F 19/3412 607/5 |
| 2013/0268890 A1* | 10/2013 | Jensen | G06Q 10/20 715/825 |
| 2014/0245282 A1* | 8/2014 | Keith, Jr. | H04L 67/1095 717/171 |
| 2014/0359602 A1* | 12/2014 | Sawaya | G06F 8/61 717/176 |
| 2015/0026662 A1* | 1/2015 | Moore | G06F 8/71 717/121 |
| 2015/0063208 A1* | 3/2015 | Abraham | H04W 8/02 370/328 |
| 2015/0106487 A1* | 4/2015 | Rezvani | G06F 21/31 709/221 |
| 2015/0178070 A1* | 6/2015 | Doi | G06F 8/61 717/172 |
| 2015/0347112 A1* | 12/2015 | Kosmynka | G06Q 30/0201 717/176 |
| 2016/0034655 A1* | 2/2016 | Gray | G06F 19/3468 713/1 |

FOREIGN PATENT DOCUMENTS

| | | |
|---|---|---|
| CN | 101710288 A | 5/2010 |
| CN | 102163157 A | 8/2011 |
| CN | 103970572 A | 8/2014 |
| CN | 104063239 A | 9/2014 |
| EP | 1170967 A1 | 1/2002 |
| GB | 2348721 A | 10/2000 |

* cited by examiner (Abstract figure)

DATA PROCESSING FOR UPGRADING MEDICAL EQUIPMENT

The present application claims the priority to Chinese Patent Applications No. 201410843341.5, filed with the Chinese State Intellectual Property Office on Dec. 30, 2014, which is incorporated herein by reference in its entirety.

BACKGROUND

Usually, large medical equipment is a complicated system that consists of various hardware and software. With the development of medical science and technology, medical equipment has become more diverse and is used more greatly than before. Accordingly, upgrades and replacements of the various hardware and software in the medical equipment are more and more frequent and system configuration for the medical equipment is more and more diversified. In the related art, when an upgrade is needed for a certain type of medical equipment, a new version of the software will be developed and a software upgrade is conducted on the medical equipment.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, MRI, digital X-ray machine, Ultrasound, PET (Positron Emission Tomography), Linear Accelerator, and Biochemistry Analyser. Currently, NMS' products are exported to over 60 countries and regions around the globe, serving more than 5,000 renowned customers. NMS's latest successful developments, such as 128 Multi-Slice CT Scanner System, Superconducting MRI, Linear Accelerator, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by way of examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Figure 1A:
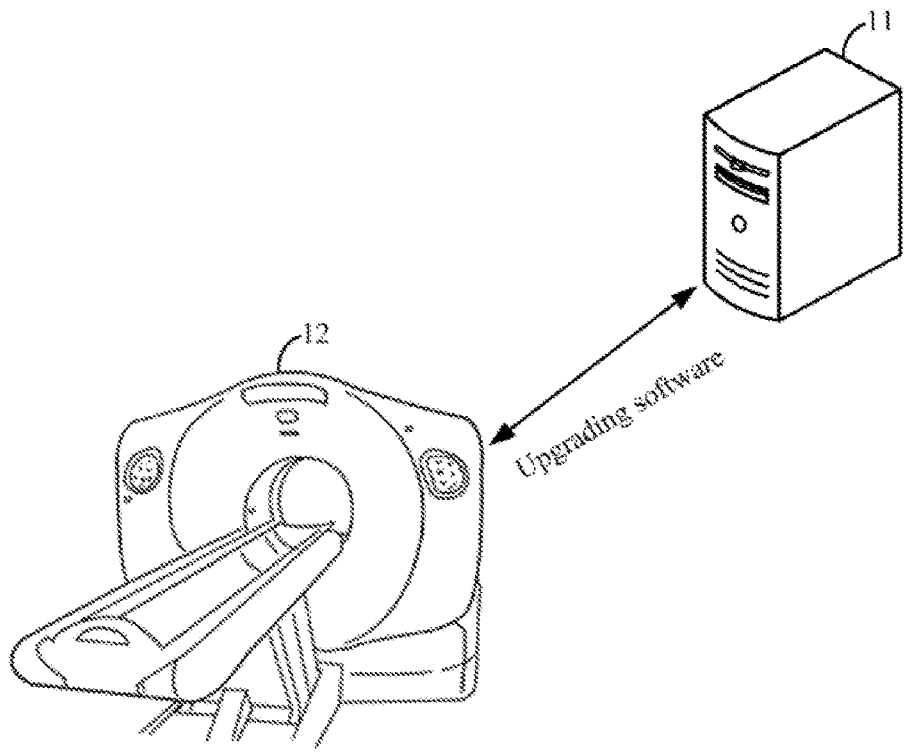
FIG. 1A is a schematic graph illustrating an application scenario of a method for data processing in an example of the present disclosure.

Referring to FIG. 1A, illustrated is an application scenario of a method for data processing in an example of the present disclosure. The application scenario may include a server 11 and medical equipment 12, where the normal operation of the medical equipment 12 may be implemented through combination of hardware and software including the software operating on the medical equipment 12 for controlling some functionalities of the medical equipment 12. In practice, new versions of software may be developed continuously to upgrade the medical equipment 12. The server 11 may be configured to distribute software upgrading packages and send the software upgrading package to the medical equipment 12 to upgrade the software in the medical equipment 12.

The method for data processing in the examples of the present disclosure may address the problems of low operation efficiency or undesirable operation results due to incompatibility between the upgraded software and hardware. In different application scenarios, the medical equipment to which the method of the present disclosure is applied may include computed tomography (CT), PET-CT, magnetic resonance imaging (MRI), etc., but is not limited to these mentioned.

The description of the method for data processing hereafter may involve some terms defined herein, and in order to make the description of the method and equipment of the present disclosure easily understood, simple explanations about these terms are given before starting the description.

System configuration of the medical equipment: as described above, the medical equipment is a complicated system that consists of software and hardware. In the examples of the present disclosure, the medical equipment may comprise a plurality of hardware components and software modules, and any of the combinations of hardware components and software modules may be termed as a "system configuration". For example, medical equipment may include "hardware component A1+hardware component B1+software module a" as a system configuration; and medical equipment may include "hardware component A2+hardware component B1+software module b" as another system configuration. Different medical equipment may have different system configurations; and thus even for the same medical equipment, when it is replaced with a new hardware component or upgraded with a new version of software, the system configuration of the medical equipment has been changed.

Upgrade Identification:

In the examples of the present disclosure, an upgrade identification is in association with a system configuration. In other words, an upgrade identification represents an identification of a system configuration. For example, a system configuration P1 may be represented by an upgrade identification S1, and a system configuration P2 may be represented by an upgrade identification S2. When issuing a software upgrading package, the server may designate one or more system configurations to which the upgrading package may be applied according to practical conditions such as software compatibility. In such a case, an upgrading identification may be used to represent a system configuration, and the upgrading package is applied to this system configuration. An upgrading identification may be generated in various ways which will be described in examples hereafter.

Upgrading Identification File:

as described above, the server may be configured to issue a software upgrading package, and designate the upgrading identification to which the software upgrading package is applied. Thus the server may maintain the upgrading identification corresponding to each of the medical equipment so as to allow the server to know to which medical equipment the upgrading package should be sent according to the designated upgrading identification. The upgrading identifications maintained by the server may be acquired from an upgrading identification file received from the medical equipment. The medical equipment itself may also generate upgrading identifications according to its own system configuration and upload an upgrading identification file containing the upgrading identifications to the server. The upgrading identification file may also include other information such as equipment number and address for the medical equipment.

Figure 1B:
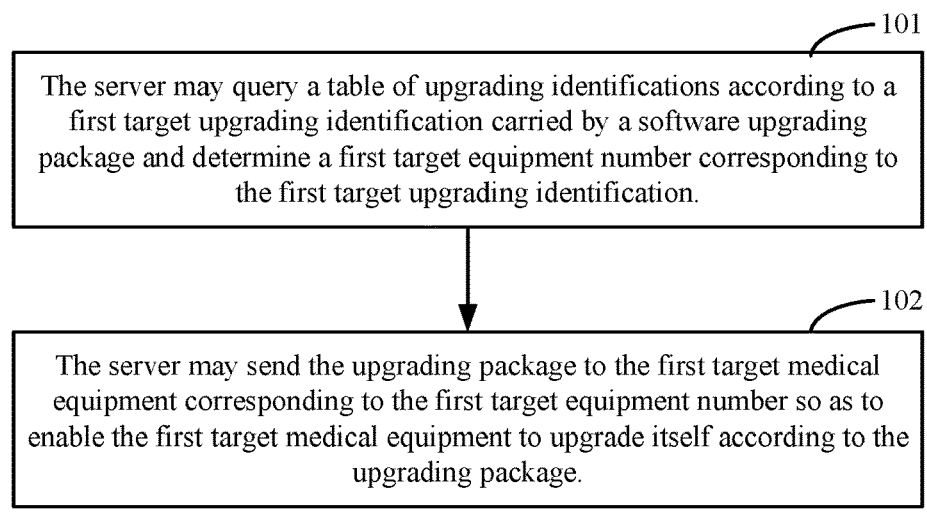
FIG. 1B is a flowchart illustrating a method for data processing in an example of the present disclosure.

The method for data processing provided in examples of the present disclosure may be applied to an on-line upgrading or an off-line upgrading of the medical equipment. FIG. 1b illustrates a method for on-line upgrading of the medical equipment, which may be performed by a server such as the server 11 shown in FIG. 1A. During the on-line upgrading of the medical equipment, the software upgrading package may be sent by the server to the medical equipment, and then the upgrading package is installed in the medical equipment for upgrading.

In block 101, the server 11 may query a table of upgrading identifications according to a first target upgrading identification carried by a software upgrading package and determine a first target equipment number corresponding to the first target upgrading identification.

For example, assuming that the server 11 distributes a software upgrading package to medical equipment for upgrading. Then in this block, the server 11 may acquire an upgrading identification to be carried in the upgrading package, which may be termed as a first target upgrading identification in this embodiment. The first target upgrading identification may be configured to identify a system configuration to which the upgrading package may be applied. For example, the system configuration applied may comprise information indicating "hardware component A1+hardware component B1+software module a", and supposing that the system configuration may be represented by an upgrading identification CB7D3D, the software upgrading package may include a first target upgrading identification "CB7D3D."

By querying a table of upgrading identifications, the server 11 may determine medical equipment corresponding to a system configuration to which the upgrading package is applied, i.e., determine medical equipment that has a system configuration corresponding to the first target upgrading identification. The determined medical equipment can be upgraded by using this upgrading package. The table of upgrading identifications may comprise association between the upgrading identifications and the equipment numbers of the medical equipment. In this example, by querying the table of upgrading identifications, an equipment number corresponding to the first target upgrading identification is acquired, which is termed as the first target equipment number.

In block 102, the server 11 may send the upgrading package to the first target medical equipment corresponding to the first target equipment number so as to enable the first target medical equipment to upgrade itself according to the upgrading package.

In this block, when the server 11 sends the upgrading package to medical equipment, the equipment corresponding to the first target equipment number may be selected as the destination. Since each of the medical equipment has a configuration to which the upgrading package is applied, incompatibility problem can be avoided when the medical equipment is upgraded according to the upgrading package. In this example, all the equipment corresponding to the first target equipment number may be termed as first target medical equipment.

In this example, it can be seen that, when the server sends the upgrading package, the server may search for and find the medical equipment corresponding to the first target upgrading identification according to the first target upgrading identification carried by the upgrading package. Since the first target upgrading identification is configured to represent a system configuration to which the upgrading package is applied, compatibility can be guaranteed when sending the software upgrading package to the medical equipment corresponding to the first target upgrading identification for upgrading. Only the medical equipment whose system configuration is compatible with the upgrading package are allowed to be upgraded with the upgrading package, thus avoiding problems such as incompatibility between hardware and upgraded software which causes low operating efficiency and undesired operating result.

In another example, in order to implement the method for data processing shown in FIG. 1B, the server 11 may generate a table of upgrading identifications according to an upgrading identification file uploaded by medical equipment. In this example, each of the medical equipment may calculate its corresponding upgrading identification according to its own system configuration, and report to the server the association between its equipment number and its upgrading identification. Accordingly, the server may generate a table of upgrading identifications based on the reported association. Referring now to the example shown in FIG. 2, and the method for data processing in the shown example may comprise blocks 201-204.

In block 201, medical equipment acquires its own system configuration.

For example, a configuration collecting software may operate on the medical equipment. The configuration collecting software can be referred to as a client operating on the medical equipment. The system configuration of the medical equipment can be collected via the client. In this example, when acquiring the system configuration of the medical equipment, the client may adopt multiple ways to acquire the system configuration, two ways of which are described in the following two examples.

One way in an example is to automatically collect information about the hardware components and information about the software modules by using the configuration collecting software. For example, before assembling, testing and final delivery of the medical equipment, the configuration collecting software may be run on the medical equipment to automatically collect information about the hardware components (such as a model of a component) and information about the software modules (such as a version of software module) on the medical equipment.

Another way in another example is a combination of automatic collection and manual determination. Some information about the hardware components and some information about the software modules cannot be obtained automatically by the configuration collecting software. In such a case, the configuration collecting software may only obtain information that can be automatically collected. The information that cannot be automatically collected may be determined by engineers or users based on the specific system configuration condition of the medical equipment. Therefore, the system configuration may be formed by two parts of information. The first part of information is automatically collected by the configuration collecting software, and the second part of information is determined manually by engineers or users. The first part of information can be referred to as the model of the first target hardware component and the version of the first target software module. The second part of information can be referred to as the model of the second target hardware component and the version of the second target software module. Accordingly, the system configuration consists of the two parts of information.

Further, the system configuration of the medical equipment may also include, but is not limited to, other information besides the model of hardware components and version of software modules listed above. During a repair of the medical equipment, if software is upgraded or a hardware component is replaced, then after the repair, the configuration collecting software (client) can be operated on the medical equipment to collect related information to update the current system configuration of the medical equipment.

In block 202, the medical equipment calculates an upgrading identification corresponding to the system configuration.

For example, there may be many ways to calculate an upgrading identification according to the system configuration, and not limited to the ways mentioned in the present disclosure.

The following is an example of a hash algorithm, exemplifying the calculation of an upgrading identification.

Each system configuration may comprise information about a plurality of hardware components and information about a plurality of software modules. Model information, e.g., a product code, of each hardware component and module information, e.g., the name and version number of each software module of a system configuration can be connected in a pre-set order to form a string, where a product code corresponds to a model of a hardware component, and each hardware component has a unique product code. Accordingly the product codes of hardware components and the names and version numbers of software modules in a system configuration of the medical equipment may be connected together to form one or more strings, and each string may correspond to a system configuration. Then the hash value of the string may be calculated and used as an upgrading identification of a system configuration of the medical equipment.

In block 203, the medical equipment sends an upgrading identification file to the server containing association between upgrading identifications and equipment numbers.

In this block, the medical equipment may generate an upgrading identification file according to the equipment numbers and upgrading identifications calculated in block 202. This upgrading identification file may include, but is not limited to, an upgrading identification and an equipment number of medical equipment.

For example, when the medical equipment sends an upgrading identification file to the server, if the network communication between the medical equipment and the server is good, the medical equipment may automatically upload the upgrading identification file to the server. For instance, after the configuration collecting software operating on the medical equipment acquires the system configuration of the medical equipment and calculates upgrading identifications, the configuration collecting software may further generate and send an upgrading identification file to the server. If the network is interrupted between the medical equipment and the server, the upgrading identification file may not be uploaded until the communication of the network is good. Alternatively, a technician may copy the upgrading identification file and upload it onto the server through the uploading interface on other network terminals provided by the server.

In block 204, the server generates a table of upgrading identifications according to the upgrading identification file.

The medical equipment may report its upgrading identification file to the server in the way illustrated in blocks 201~203. The server may acquire the upgrading identification files uploaded by a plurality of medical equipment respectively. Each upgrading identification file includes the equipment number and the upgrading identification of its corresponding medical equipment.

In this block, the server may generate a table of upgrading identifications according to the upgrading identification files. The content in the table of upgrading identifications is partially exemplified in Table 1 described below. Referring to Table 1, the identical Equipment Number may correspond to different Serial Numbers, which represents that the system configuration corresponding to the Equipment Number may vary. A set of Serial Number values may be used to indicate the history of variation for the system configuration. For example, the Serial Number value corresponding to the Equipment Number SN191901 may be 1, 2, and so on.

TABLE 1

Table of Upgrading Identifications

| Serial Number | Equipment Number | Upgrading Identification |
|---|---|---|
| 1 | SN191901 | CB7D3D |
| 1 | SN191921 | B1B2B3 |
| 2 | SN191901 | AC75D3 |
| ... | ... | ... |

In practical implementation, based on different information in the uploading identification files, the table of upgrading identifications may include other association relations, but is not limited to these mentioned herein.

After the above block, the server may generate the table of upgrading identifications. The server may select medical equipment based on the table when issuing a software upgrading package. For example, as shown in FIG. 1B, by querying the table of upgrading identifications, the server may determine to which medical equipment the upgrading package should be sent.

Figure 3:
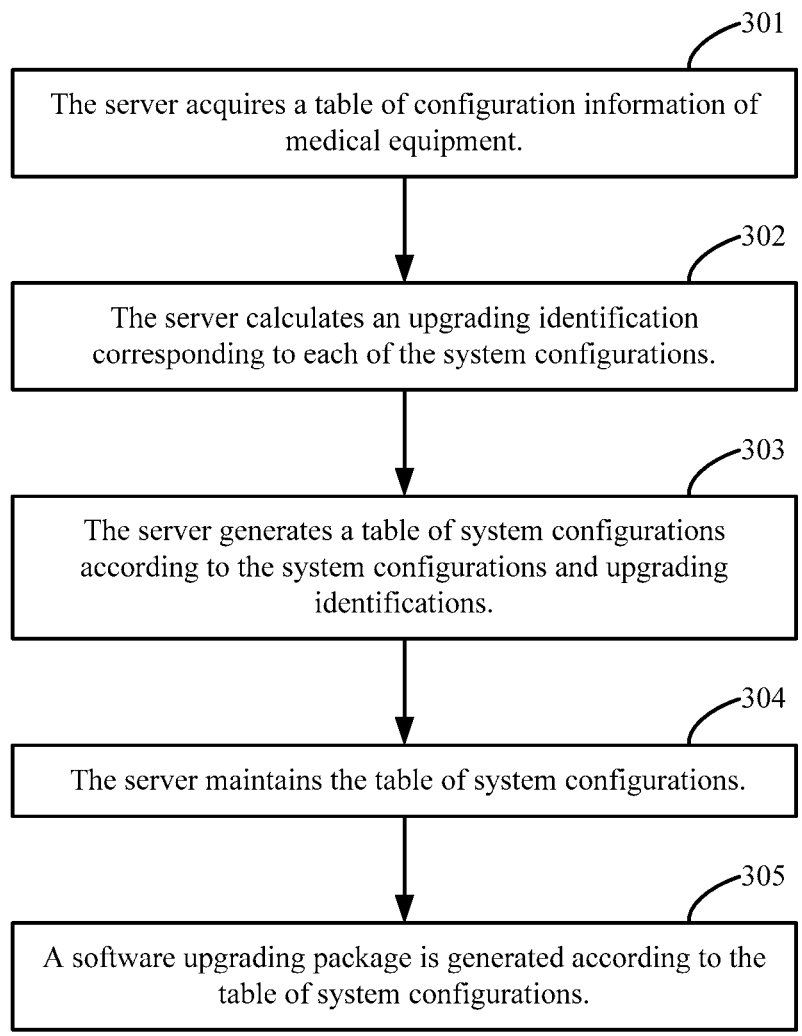
FIG. 3 is a flowchart illustrating a method for data processing in yet another example of the present disclosure.

In another example, the server may not only generate the table of upgrading identifications as described above to determine to which medical equipment the upgrading package should be sent, but also maintain a table of system configurations of medical equipment. The table of system configurations includes association relations between the upgrading identifications and system configurations of medical equipment and can be configured to generate a software upgrading package. Referring to FIG. 3, illustrated is a method for data processing in another example of the present disclosure. In this example, the server may generate and maintain the table of system configurations.

In block 301, the server acquires a table of configuration information of medical equipment.

For example, the medical equipment may be divided into a plurality of hardware components and a plurality of software modules. Each hardware component and each software module are exhausted and listed, and then all the possible system configurations of medical equipment are formed by a plurality of hardware components of different models and a plurality of software modules of different versions. According to the all possible system configurations, a table of configuration information is generated. The server acquires the table of configuration information. Part of the content of the table of configuration information is shown in the Table 2 as below.

Referring to Table 2, the table of configuration information may include multiple types of system configurations. For example, system configuration 1 represents a combination of "component 1 of model 1+module 1 of version 1+component 2 of model 1", and system configuration 2 represents a combination of "component 1 of model 1+module 1 of version 2+component 2 of model 1". Of course, it also includes other configuration information which is omitted here for avoidance of redundancy.

In block 302, the server calculates an upgrading identification corresponding to each of the system configurations.

Figure 2:
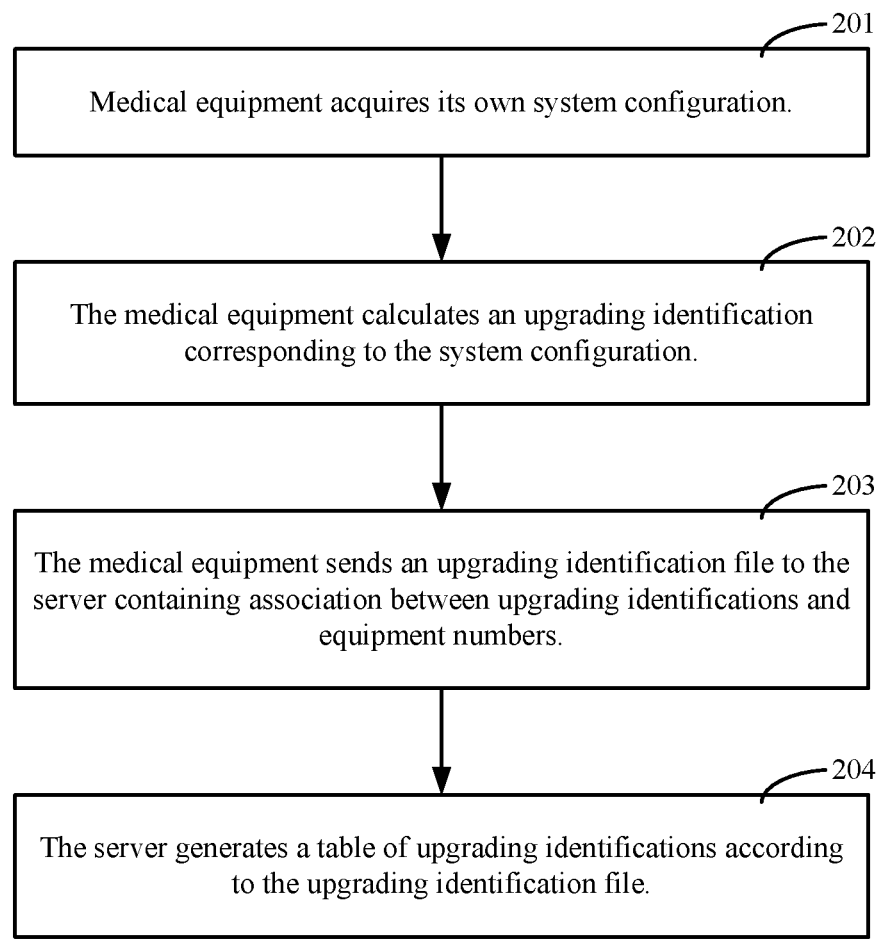
FIG. 2 is a flowchart illustrating a method for data processing in another example of the present disclosure.

In this block, the server calculates an upgrading identification corresponding to each of the system configurations in the same way as illustrated in the process of block 202 in the example of FIG. 2. For example, a hash algorithm can be used to calculate the upgrading identification. The server may calculate the upgrading identification corresponding to each of the system configurations, respectively.

In block 303, the server generates a table of system configurations according to the system configurations and upgrading identifications.

For example, the table of system configuration may include each of the system configurations and its corresponding upgrading identification. The above-described table of configuration information is used to record the hardware components and software modules contained in the medical equipment, and various system configurations formed from these hardware components and software modules. The upgrading identifications are used as identifications for system configurations, and an upgrading identification may be calculated in association with each of the system configurations. In this block, by adding the upgrading identification corresponding to each of the system configurations into the table of configuration information the table of system configurations can be generated. The table of system configurations includes each of the system configurations and its corresponding upgrading identification.

Taking the table of configuration information in Table 2 as an example, suppose that the upgrading identification corresponding to the system configuration 1 is calculated as EA1038, and that the upgrading identification corresponding to the system configuration 2 is 2F3D2H. The server may then generate a table of system configurations, such as Table 3 shown below.

TABLE 2

Table of Configuration Information

| | Hardware Component/Software Module | Optional ? | Component Model/Module Version | System Configuration 1 | System Configuration 2 |
|---|---|---|---|---|---|
| Medical Equipment | Component 1 | No | Model 1 | ✓ | ✓ |
| | | | Model 2 | | |
| | Module 1 | No | Version 1 | ✓ | |
| | | | Version 2 | | ✓ |
| | Component 2 | Yes | Model 1 | ✓ | ✓ |

TABLE 3

Table of System Configurations

| Hardware Component/Software Module | | Optional? | Component Model/Module Version | System Configuration 1 | System Configuration 2 |
|---|---|---|---|---|---|
| Medical Equipment | Component 1 | No | Model 1 | ✓ | ✓ |
| | | | Model 2 | | |
| | Component 1 | No | Version 1 | ✓ | |
| | | | Version 2 | | ✓ |
| | Component 2 | Yes | Model 1 | ✓ | ✓ |
| | Upgrading Identification | | | EA1038 | 2F3D2H |

In block 304, the server maintains the table of system configurations.

In this block, the server may maintain the generated table of system configurations. For example, when a hardware component of the medical equipment is to be replaced with a new model or a software module of the medical equipment is to be upgraded with a new version, the server may add this new model of hardware component or the new version of software module to the table of system configurations. The server also forms a new system configuration using the new model of hardware component or the new version of software module, calculates an upgrading identification corresponding to the new system configuration according to the process described in block 302, and generates a new table of system configurations according to the process described in block 303.

For example, still taking the example illustrated in Table 3, if the hardware component 1 has a newly added model 3, then the number of the system configurations may be also increased. As shown in Table 4, two system configurations are added. In other examples the number of the added system configurations may be more than two. Table 4 shows one part for exemplification.

the software upgrading package, a deployment engineer who is responsible for issuing the software upgrading package may determine which system configurations applied to the upgrading package of software can be issued (that is, only the system configurations which pass the validation test can be issued with the software upgrading package). The deployment engineer may search the table of system configurations on the server to obtain the system configurations corresponding to the upgrading package that will be issued, and upgrading identifications corresponding to the applied system configurations. The upgrading identifications are the first target upgrading identifications to be carried in the software upgrading package. The deployment engineer may incorporate the first target upgrading identifications into the software upgrading package, and upload the software upgrading package to the server so that the server may acquire the software upgrading package.

As another example, after developing a software upgrading package and designating the system applications applied to the upgrading package, the development engineer may upload the software upgrading package containing the applied system configurations to the server. Based on the system configurations contained in the software upgrading

TABLE 4

Updated Table of System Configurations

| Hardware Component/ Software Module | | Optional? | Component Model/ Module Version | System Configuration 1 | System Configuration 2 | System Configuration 3 | System Configuration 4 |
|---|---|---|---|---|---|---|---|
| Medical Equipment | Component 1 | No | Model 1 | ✓ | ✓ | | |
| | | | Model 2 | | | | |
| | | | Model 3 | | | | ✓ |
| | Module 1 | No | Version 1 | ✓ | | ✓ | ✓ |
| | | | Version 2 | | ✓ | | |
| | Component 2 | Yes | Model 1 | ✓ | ✓ | ✓ | ✓ |
| | Upgrading Identification | | | EA1038 | 2F3D2H | AB1234 | CD2234 |

It can be seen from Table 4, when component 1 has a newly added model 3, the number of the system configurations of the medical equipment also increases. The server may then calculate the upgrading identification corresponding to each of the increased system configurations.

In block 305, a software upgrading package is generated according to the table of system configurations.

After the table of system configurations described above is generated, the table of system configurations may be used to generate a software upgrading package. For example, after the software upgrading package is generated, the system configurations applied to the software upgrading package may be designated according to the compatibility of the software upgrading package. Based on the validation on package the server may query the table of system configurations stored therein to acquire the upgrading identifications corresponding to the applied system configurations, and add these upgrading identifications to the software upgrading package as the first target upgrading identifications. That is, the server may perform the process of acquiring the first target upgrading identifications corresponding to the system configurations applied to the upgrading package, and adding these first target upgrading identifications to the software upgrading package.

In this example, the server may generate a table of system configurations, and, the server may also generate a table of upgrading identifications according to the process shown in FIG. 2. Therefore, the server can store the table of upgrading identifications and the table of system configurations at the same time. By generating the table of system configurations for the software upgrading package, the system configurations applied to the software upgrading package can be changed to the first target upgrading identification contained in the software upgrading package. Moreover, based on the table of upgrading identifications, the medical equipment corresponding to the first target upgrading identification can be searched and the software upgrading package can be sent to the medical equipment. It can be seen that, the server may send the software upgrading package to the applied medical equipment by combining the table of system configurations and the table of upgrading identifications.

Further, the table of system configurations and the table of upgrading identifications generated by the server may be two separate tables. The two tables may be indexed to each other by the upgrading identifications, i.e., the upgrading identification corresponding to the equipment number in the table of upgrading identifications may be indexed to a system configuration in the table of system configurations. Alternatively, the table of system configurations and the table of upgrading identifications may be integrated into one table which collectively stores information about the system configurations and the upgrading identifications. In this case, the present disclosure uses two names for the table of system configurations and the table of upgrading identifications. Those skilled in the related art should recognize that the two tables can refer to one same storage table. For avoidance of redundancy, the description below is provided in an example in which the table of system configurations and the table of upgrading identifications are two separate tables.

In another example, the table of system configurations generated by the server may be used to not only generate a software upgrading package, but also store information about transition history of system configurations of medical equipment. For example, when a user wants to acquire the transition history of a system configuration of medical equipment (for example, indicating a change or changes of a software module or hardware component of the medical equipment in a certain time period, such as, a software module upgraded from version 1 to version 2), the user may acquire such information by using the combination of the table of system configurations and the table of upgrading identifications.

In the present example, in order to facilitate querying of the transition history of a system configuration of medical equipment, the table of upgrading identifications acquired by the server from medical equipment may further include a timestamp. For example, a timestamp in the upgrading identification file may have an association with an equipment number and an upgrading identification, and the upgrading identification file may include upgrading identifications, equipment numbers and timestamps in association with each other. For example, the association "equipment number SN191901—upgrading identification CB7D3D— timestamp Jun. 5, 2014 12:03:31" represents that the medical equipment with the equipment number SN191901 updates its system configuration into a configuration corresponding to the upgrading identification CB7D3D at time Jun. 5, 2014 12:03:31.

Based on the upgrading identification file including timestamps received from the medical equipment, the server may generate a table of upgrading identifications which also includes timestamps. A part of the content of the table of upgrading identifications in an example is shown in the table 5 below.

TABLE 5

Table of Upgrading Identifications

| Serial Number | Equipment Number | Upgrading Identification | Timestamp |
|---|---|---|---|
| 1 | SN191901 | CB7D3D | 2014/6/5 12:03:31 |
| 1 | SN191921 | B1B2B3 | 2014/7/1 08:03:11 |
| 2 | SN191901 | AC75D3 | 2014/7/5 09:12:11 |
| ... | ... | ... | ... |

From the table 5, when medical equipment updates, its system configuration can be acquired. Besides, in Table 5, "Serial Number" may be used to represent a record corresponding to the update of system configurations of medical equipment. Taking medical equipment SN191901 as an example, in Table 5, two records about the system configurations corresponding to the medical equipment are found, "SN191901—CB7D3D—Jun. 5, 2014 12:03:31" corresponding to serial number 1 and "SN191901—AC75D3— Jul. 5, 2014 09:12:11" corresponding to serial number 2, and the two records represent that the medical equipment updates its system configuration into CB7D3D at time Jun. 5, 2014 12:03:31, and the medical equipment updates its system configuration into AC75D3 at time Jul. 5, 2014 09:12:11.

Figure 4:
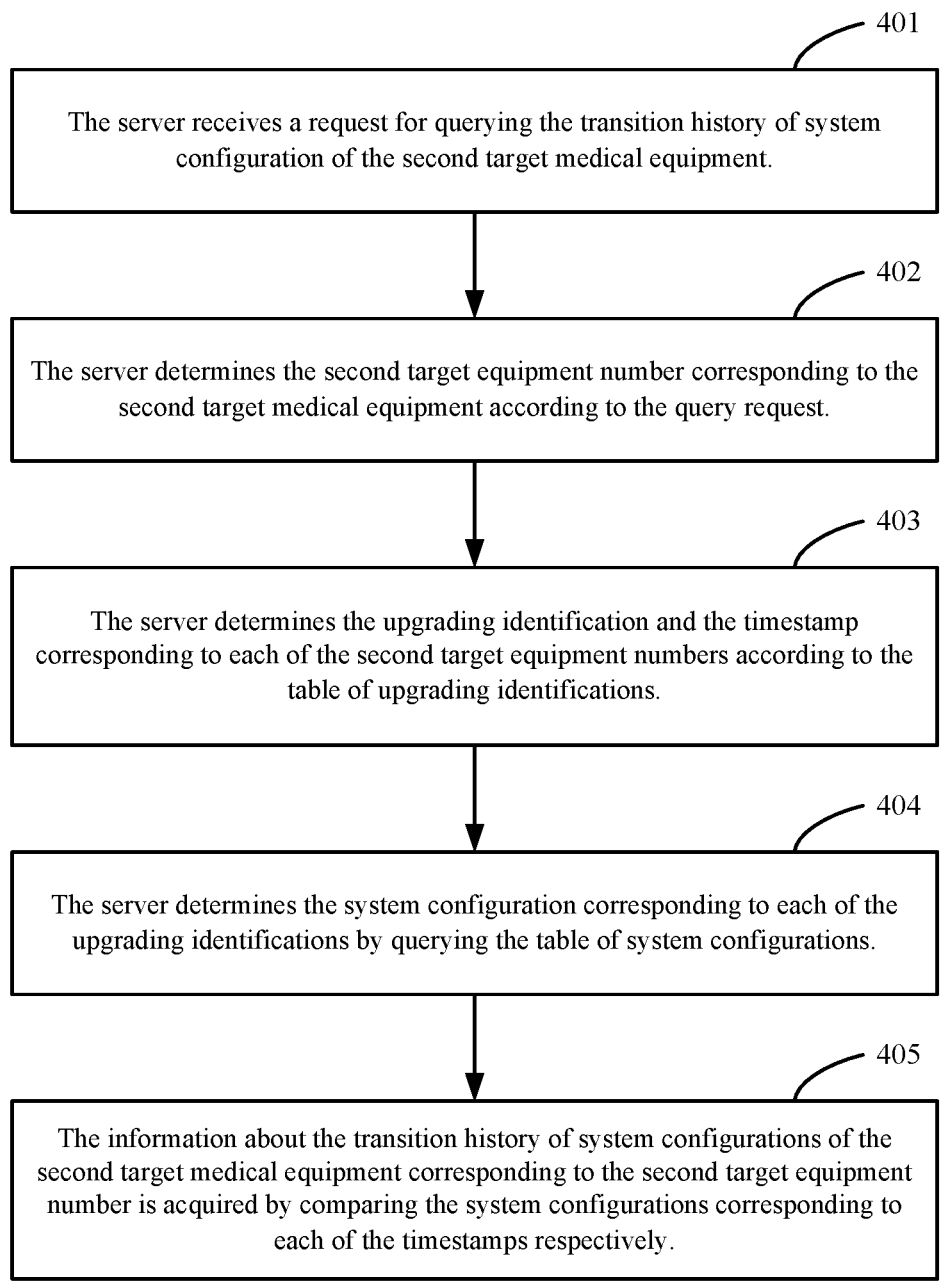
FIG. 4 is a flowchart illustrating a method for data processing in still another example of the present disclosure.

Based on the above table of upgrading identifications including timestamps, FIG. 4 illustrates a process of how the server acquires the transition history of system configurations according to the table of upgrading identifications and the table of system configurations.

In block 401, the server receives a request for querying the transition history of system configuration of the second target medical equipment.

For example, in the block, assuming that a user wants to query information about the transition history of system configurations of the medical equipment, the equipment which the user wants to query may be termed as the second target medical equipment. The user may send a query request to the server and input the equipment number corresponding to the second target medical equipment which can be termed as the second target equipment number, and the server may receive the query request including the second target equipment number from the user.

In block 402, the server determines the second target equipment number corresponding to the second target medical equipment according to the query request.

For example, as illustrated in block 401, the second target equipment number corresponding to the second target medical equipment may be carried in the query request so as to allow the server to learn about the medical equipment to be queried.

In block 403, the server determines the upgrading identification and the timestamp corresponding to each of the second target equipment numbers according to the table of upgrading identifications.

For example, when the server determines the second target equipment number, it queries the table of upgrading identifications. When there are more than one second target equipment number in the table of upgrading identifications, the server may, according to the association between the timestamps, the upgrading identifications and the equipment numbers in the table of upgrading identifications, determine the upgrading identification and the timestamp corresponding to each of the second target equipment numbers to acquire a plurality of upgrading identifications and a plurality of timestamps.

Taking the equipment in the table of upgrading identifications illustrated in Table 5 as an example, assuming that the second target equipment number corresponding to the second target medical equipment queried by the user is SN191901, by querying Table 5, two SN191901s are found, which corresponds to two records of the system configuration which correspond to the serial number 1 and the serial number 2. Each of the two records includes an upgrading identification and a timestamp corresponding to the second target medical equipment SN191901.

In block 404, the server determines the system configuration corresponding to each of the upgrading identifications by querying the table of system configurations.

For example, the server may, according to the upgrading identifications corresponding to the second target medical equipment, query the system configurations corresponding to these upgrading identifications in the table of system configurations. When there is a plurality of the second target equipment numbers in the table of upgrading identifications, there is a plurality of corresponding upgrading identifications accordingly. The server may determine the system configuration of the upgrading identification corresponding to each of the second target equipment numbers by querying the table of system configurations. These system configurations corresponding to these upgrading identifications also correspond to the timestamps in association with the upgrading identifications.

In block 405, the information about the transition history of system configurations of the second target medical equipment corresponding to the second target equipment number is acquired by comparing the system configurations corresponding to each of the timestamps respectively.

For example, still taking the example in Table 5, the server may learn that the system configuration corresponding to the timestamp Jun. 5, 2014 12:03:31 is the configuration corresponding to the upgrading identification CB7D3D, and the system configuration corresponding to the timestamp Jul. 5, 2014 09:12:11 is the configuration corresponding to the upgrading identification AC75D3. Accordingly, the information about the transition history of system configuration of the second target medical equipment is acquired. The server may send the queried information about the transition history of the system configuration back to the user's terminal that has sent the query request so as to allow the user to learn about the transition history.

Figure 5:
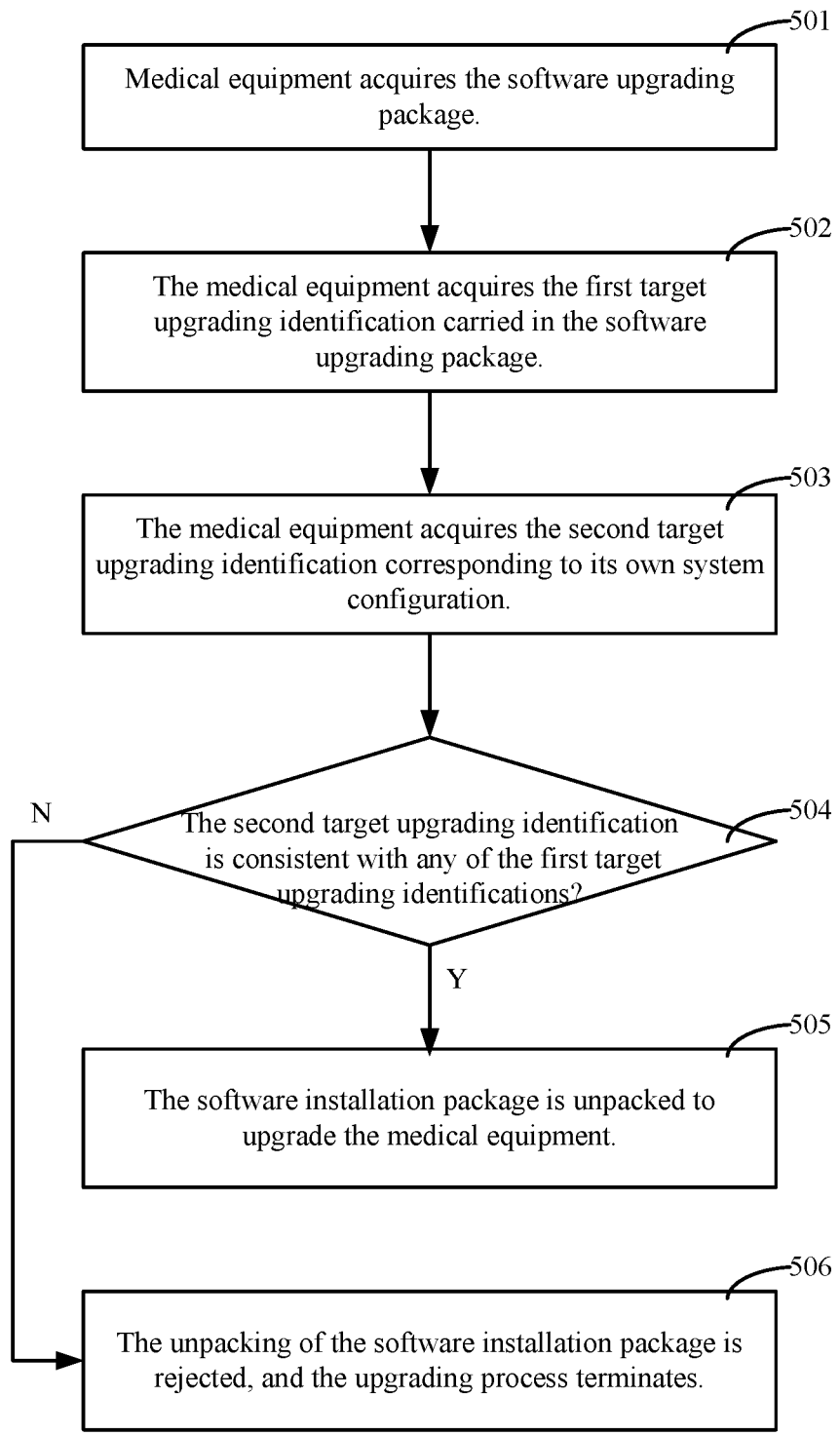
FIG. 5 is a flowchart illustrating a method for data processing in a further example of the present disclosure.

Above examples illustrate the process of how the server upgrades medical equipment online, and the maintenance for the table of upgrading identifications and the table of system configurations by the server, along with some applications based on these tables, such as the transition history of the system configuration used to search the medical equipment. The example in FIG. 5 illustrates the off-line upgrading of the medical equipment.

When upgrading online, the server may select which medical equipment the upgrading package of software should be sent to, such as determining the medical equipment according to the table of upgrading identifications to guarantee the compatibility of the medical equipment with the software upgrading package. During an off-line upgrade of the medical equipment, the software upgrading package may be installed by an engineer by inserting an optical disk containing the software upgrading package to the medical equipment rather than by sending the software upgrading package to the medical equipment by the server, which allows for the medical equipment to acquire the software upgrading package. In such a case, the compatible installation of the upgrading package onto the medical equipment may be controlled by the medical equipment itself. Referring to the process exemplified in FIG. 5.

In block 501, medical equipment acquires the software upgrading package.

For example, when the medical equipment is in an off-line state, the user may copy the software upgrading package onto the medical equipment, such as by inserting an optical disk containing the software upgrading package into the medical equipment so as to allow the medical equipment to acquire the software upgrading package.

In block 502, the medical equipment acquires the first target upgrading identification carried in the software upgrading package.

For example, a complete software upgrading package may include a first target upgrading identification. The first target upgrading identification indicates the system configuration of the medical equipment applied to the software upgrading package. For example, when the software upgrading package is copied onto the medical equipment, the software upgrading package starts operating and unpacking the installation package which contains the first target upgrading identification.

In block 503, the medical equipment acquires the second target upgrading identification corresponding to its own system configuration.

For example, in the example illustrated in FIG. 2, the medical equipment may calculate the upgrading identification corresponding to its own system configuration, and report the upgrading identification and the equipment number to the server. In the present example, the upgrading identification corresponding to its own system configuration of the medical equipment may be termed as the second target upgrading identification. The second target upgrading identification may be calculated in the same way as the server calculates the upgrading identification, such as using the same hash algorithm. After calculating the second target upgrading identification, the second target upgrading identification may be stored into the medical equipment. For example, the second target upgrading identification may be stored onto the master computer of medical equipment, and the calculated second target upgrading identification may be stored at a pre-defined location or at a fixed location.

In this block, the medical equipment may read the second target upgrading identification from the above location where the second target upgrading identification is stored. Alternatively, medical equipment may acquire its second target upgrading identification in other ways. It should be noted that the blocks in this example may be implemented in an order different from that described herein. For example, block 503 may be executed before block 502 or after block 502.

In block 504, the medical equipment determines whether the second target upgrading identification is consistent with any of the first target upgrading identifications.

If the second target upgrading identification is consistent with any of the first target upgrading identifications, it indicates that the system configuration of medical equipment is compatible with the software upgrading package, then block 505 is executed to unpack the software installation package to upgrade the medical equipment.

Otherwise, block 506 is executed, and the unpacking of the software installation package is rejected, and the upgrading process terminates.

When medical equipment is upgraded off-line, the method of data processing in the present example determines whether the first target upgrading identification contained in the upgrading package is consistent with the second target upgrading identification of medical equipment. Only when they are consistent with each other, the software upgrading package is installed on the medical equipment so that only the medical equipment whose system configuration is compatible with the software upgrading package is allowed to upgrade. Therefore, low efficiency or undesired operating results due to the incompatibility of the upgraded software and the hardware in some medical equipment can be avoided.

Figure 6:
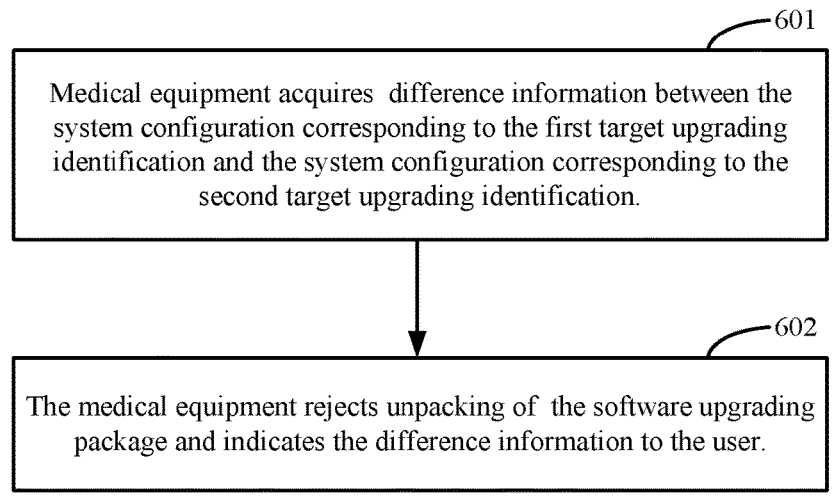
FIG. 6 is a flowchart illustrating a method for data processing in another further example of the present disclosure.

In another example, when the second target upgrading identification is consistent with none of the first target upgrading identifications, in order for the user to know clearly about the reasons why the software upgrading package cannot be installed, the reason why the upgrading package is rejected to unpack may be further indicated to the user. For example, the medical equipment may acquire information about difference between the system configuration corresponding to the first target upgrading identification and the system configuration corresponding to the second target upgrading identification, and indicate the difference information to the user. Referring to the process illustrated in FIG. 6.

In block 601, medical equipment acquires difference information between the system configuration corresponding to the first target upgrading identification and the system configuration corresponding to the second target upgrading identification. Alternatively, the server may compare the system configuration corresponding to the second target upgrading identification with the system configuration corresponding to the first target upgrading identification, and feedback difference information to the medical equipment.

In block 602, the medical equipment rejects unpacking of the software upgrading package and indicates the difference information to the user.

For example, when the medical equipment acquires the difference information, it may indicate the difference information to the user, and inform the user which hardware components or software modules are not compatible with the software upgrading package, and reject to unpack the software installation package.

For example, it is assumed that the software upgrading package P1 issued by the engineer is applied to a system configuration EA1038. It is further assumed that when the software upgrading package is being installed off-line on a CT system, and when the engineer inserts an optical disk containing the software upgrading package P1 into the CT system of the equipment number SN192392 and installs the software upgrading package P1 the software upgrading package P1 may indicate an error and exit automatically. From Table 6 described below, it can be easily seen that, the system configuration of equipment number SN192392 may indicate that hardware component 1 of Model 2 does not support the installation of the software upgrading package.

TABLE 6

| | Hardware Component/Software Module | Optional? | Component Model/Module Version | CT system configuration 1-P1 applied | CT system configuration 3-target system SN192392 | CT system configuration 5-P1 applied |
|---|---|---|---|---|---|---|
| CT system | Component 1 | No | Model 1 | ✓ | | ✓ |
| | | | Model 2 | | ✓ | |
| | Module 1 | No | Version 1 | ✓ | ✓ | ✓ |
| | | | Version 2 | | | |
| | Component 2 | Yes | Model 1 | ✓ | ✓ | |
| | Upgrading Identification | | | EA1038 | CB7D3D | B1B2B3 |

For example, when the medical equipment determines that the second target upgrading identification is not consistent with the first target upgrading identification, the server may query the table of system configurations to acquire the aforementioned first and second system configurations. For example, when the software upgrading package is operating on the medical equipment, as the process illustrated in FIG. 5, it may be determined that the first target upgrading identification is not consistent with the second target upgrading identification. Then the software upgrading package may send the first target upgrading identification and the second target upgrading identification to the server, and based on the first and second target upgrading identifications, the server may query the table of system configurations stored therein to acquire the system configuration corresponding to each of the upgrading identifications.

The server may return the system configuration that corresponds to each of the upgrading identifications acquired by querying the table of system configurations, to the medical equipment, and the medical equipment will compare these system configurations. For example, the software upgrading package may compare the system configuration corresponding to the first target upgrading identification and the system configuration corresponding to the In this example, when the medical equipment rejects to upgrade itself, it may indicate the difference information to the user, by, e.g., informing the user why the upgrading is rejected and further which hardware components or software modules prevent the software upgrading package from being installed. This allows the user to replace hardware components or update software modules for upgrading.

In yet another example, it can be seen from the process illustrated in FIG. 5 that, when the medical equipment installs the software upgrading package off-line, the software upgrading package may determine whether the first target upgrading identification carried in the software upgrading package is consistent with the second target upgrading identification corresponding to the system configuration of medical equipment to be upgraded. Only when they are consistent with each other, the installation is executed. In this way, the above process can be performed not only during off-line installation but also during on-line installation. For example, assuming that the server sends the software upgrading package to the medical equipment to be upgraded, when the software upgrading package arrives at the medical equipment and starts being installed on the medical equipment, the above processing illustrated in FIG. 5 may also be performed. Whether the first target upgrading identification is consistent with the second target upgrading identification can be determined. If they are inconsistent, an indication will be provided.

Although when the server sends the software upgrading package to the destination medical equipment, the destination medical equipment has been determined as applied for the software upgrading package according to the first target upgrading identification, there is still a possibility that the first target upgrading identification is not consistent with the second target upgrading identification when the software upgrading package is being installed on the medical equipment. For example, when receiving the software upgrading package, the medical equipment may be in the phase of scanning process and cannot install the software upgrading package until the medical equipment finishes its current work and becomes idle. Another possibility is that before the installation starts, the system configuration of the medical equipment has changed, but the server has not been updated yet. This possibility causes the upgrading identification of the software upgrading package inconsistent with the upgrading identification of the current system configuration of the medical equipment during installation. Thus, to further ensure the compatibility of the software upgrading package with the medical equipment, the process illustrated in FIG. 5 is performed once every time before the software upgrading package starts installing the software on the medical equipment.

Figure 7:
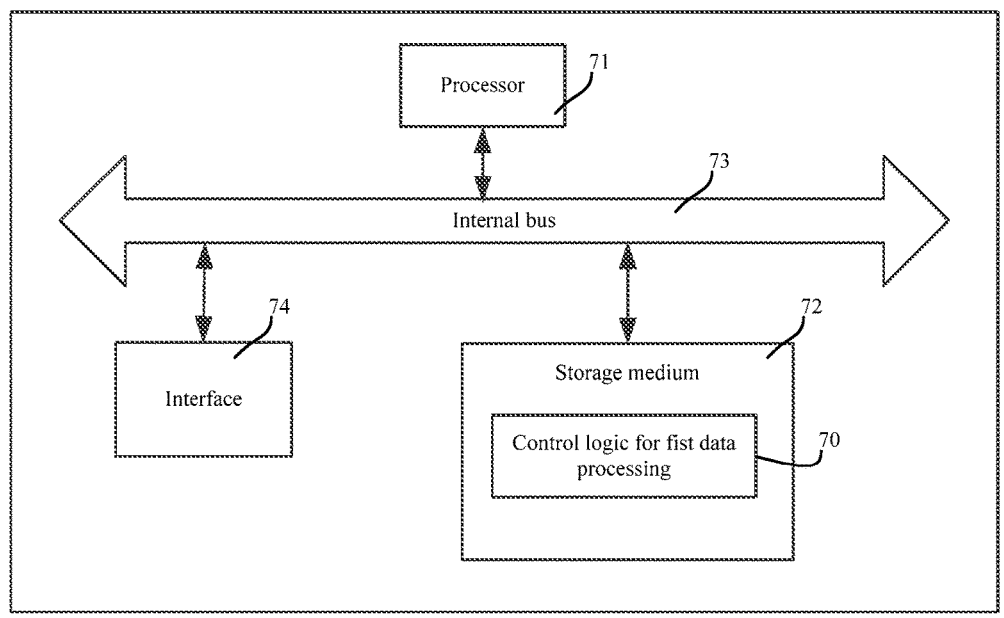
FIG. 7 is a block diagram illustrating a server in an example of the present disclosure.

Referring to FIG. 7, in association with the method described above, the present disclosure also provides a server. As shown in FIG. 7, the server may include a processor 71 and a machine-readable storage medium 72, wherein the processor 71 and the machine-readable storage medium 72 are connected with each other through an internal bus 73. In other possible implementations, the server may further include an external interface 74 so as to communicate with other devices or components.

In different examples, the machine-readable storage medium 72 may include random access memory (RAM), volatile memory, non-volatile memory, flash memory, storage drive (such as hard disk drive), solid-state hard disk, other types of storage disk (such as optical disk and DVD), and similar types of storage medium or combinations thereof.

The machine readable storage medium 72 stores control logic 70 for first data processing. As illustrated in FIG. 7, the control logic 70 herein should be understood as computer instructions stored in the machine readable storage medium 72. When a CPU 71 on the server of the present disclosure executes the control logic 70, the CPU 71 invokes the instructions corresponding to the control logic 70 stored on the machine readable storage medium 72 to:

query a table of upgrading identifications and determine the first target equipment number corresponding to the first target upgrading identification according to the first target upgrading identification carried in a software upgrading package, where the table of upgrading identifications including the association between the upgrading identification and the equipment number of the medical equipment; and send the software upgrading package to the first target medical equipment corresponding to the first target equipment number so as to enable the first target medical equipment to upgrade itself according to the software upgrading package.

Further, the processor reads the machine readable instructions to: acquire an upgrading identification file of the medical equipment, where the upgrading identification file includes the upgrading identification and the equipment number of the medical equipment; and generate the table of upgrading identifications according to the upgrading identification file.

Further, the processor reads the machine readable instructions to: generate a table of configuration information of the medical equipment, where the table of configuration information includes the configuration information of all the system configurations of the medical equipment; calculate the upgrading identification corresponding to each of the system configurations; generate a table of system configuration according to the table of configuration information and the upgrading identifications, where the table of system configuration used to generate the software upgrading package and to indicate the system configuration corresponding to each of the upgrading identifications.

Further, each of the system configurations may include the information about a plurality of hardware components and the information about a plurality of software modules; the processor reads the machine readable instructions to: connect, for each of the system configurations, the product code of each of the hardware components and the name and version of each of the software modules in the system configuration in a pre-set order to form a string, where the product code corresponds to the model of each of the hardware components; and calculate the hash value of the string, where the calculated hash value is used as the upgrading identification of the system configuration.

Further, the upgrading identification file may include timestamps; the table of upgrading identifications may comprise association between the timestamps, the upgrading identifications and the equipment numbers; the processor reads the machine readable instructions to: receive a query request for transition history of system configuration of the second target medical equipment to be queried, and determine the second target equipment number corresponding to the second target medical equipment according to the query request; determine the upgrading identification and the timestamp corresponding to each of the second target equipment numbers according to the association between the timestamps, the upgrading identifications and the equipment numbers when there is a plurality of second target equipment numbers in the table of upgrading identifications; query the table of system configurations to determine the system configuration corresponding to the upgrading identification in association with each of the second target equipment numbers; and compare the system configurations corresponding to each of the timestamps respectively to acquire the information about the transition history of system configuration of the second target medical equipment corresponding to the second target equipment numbers.

Figure 8:
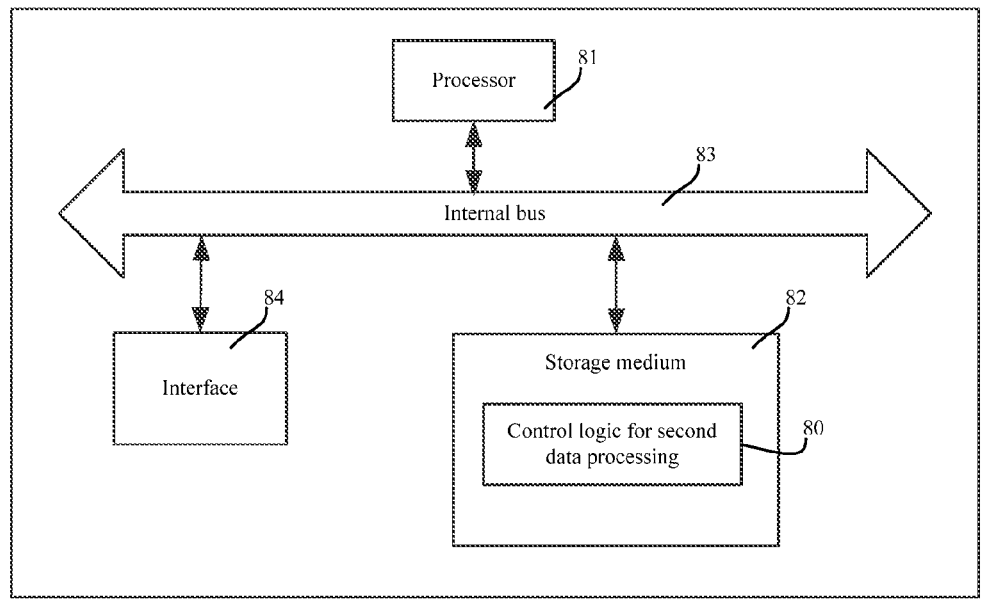
FIG. 8 is a block diagram illustrating medical equipment in an example of the present disclosure.

Referring to FIG. 8, in association with the above method, the present disclosure provides the medical equipment. As illustrated in FIG. 8, the server may include a processor 81 and machine readable storage medium 82, wherein the processor 81 and the machine readable storage medium 82 are connected with each other through an internal bus 83. In other possible implementations, the server may further include an external interface 84 so as to communicate with other devices or components.

In different examples, the machine readable storage medium 82 may include: random access memory (RAM), volatile memory, non-volatile memory, flash memory, storage drive (such as hard disk drive), solid state hard disk, other types of storage disks (such as optical disk, DVD), or similar types of storage medium, or combinations thereof.

The machine readable storage medium 82 stores control logic 80 for second data processing. As illustrated in FIG. 8, the control logic 80 of the present disclosure should be understood as computer instructions stored in the machine readable storage medium 82. When the CPU 81 on the server of the present disclosure executes the control logic 80, the CPU 81 invokes the instructions corresponding to the control logic 80 stored on the machine readable storage medium 82 to:

acquire first target upgrading identifications in the software upgrading packet to be unpacked;

compare the first target upgrading identifications with a second target upgrading identification corresponding to the system configuration of the medical equipment, and if the second target upgrading identification is consistent with any of the first target upgrading identifications, then unpack the software installation package to upgrade the medical equipment.

Further, if the second target upgrading identification is consistent with none of the first target upgrading identifications, the processor reads the machine readable instructions to:

acquire difference information describing the difference between the system configuration corresponding to the second target upgrading identification and the system configuration corresponding to each of the first target upgrading identifications; and reject to unpack the software upgrading package and indicate the difference information to the user.

Figure 9:
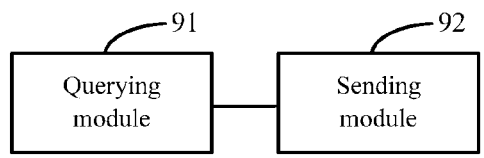
FIG. 9 is a block diagram illustrating a structure of a first data processing control logic in an example of the present disclosure.

Referring to the example in FIG. 9, the control logic for first data processing stored in the server, in terms of functionality, may comprise:

a querying module 91, configured to query the table of upgrading identification and determine the first target equipment number corresponding to the first target upgrading identification according to the first target upgrading identification in the software upgrading package, where the table of upgrading identification includes the association between the upgrading identification and the equipment number of the medical equipment; and a sending module 92, configured to send the software upgrading package to the first target medical equipment corresponding to the first target equipment number so as to allow the first target medical equipment to upgrade itself according to the software upgrading package.

In an example, the first target upgrading identification may be used to identify the system configuration of the medical equipment to which the software upgrading package is designated as applied; and the upgrading identification in the table of upgrading identification may be used to identify the system configuration of the medical equipment.

Figure 10:
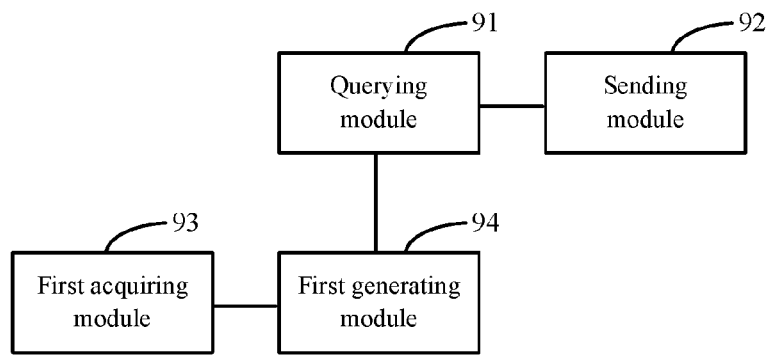
FIG. 10 is a block diagram illustrating a structure of the first data processing control logic in another example of the present disclosure.

In an example, referring to FIG. 10, the control logic may further include:

a first acquiring module 93, configured to acquire an upgrading identification file of the medical equipment, where the upgrading identification file includes the upgrading identification and the equipment number of the medical equipment; and a first generating module 94, configured to generate the table of upgrading identifications according to the upgrading identification file.

Figure 11:
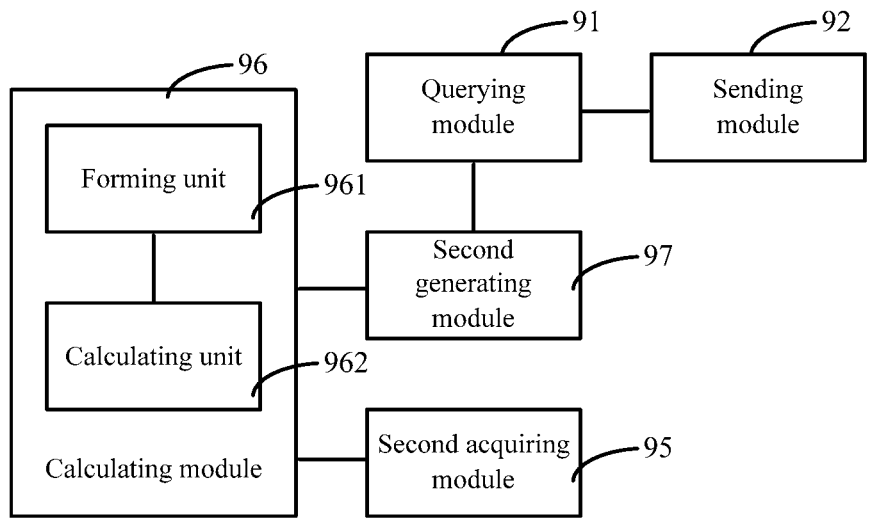
FIG. 11 is a block diagram illustrating a structure of the first data processing control logic in still another example of the present disclosure.

In an example, referring to FIG. 11, the control logic may further include:

a second acquiring module 95, configured to generate a table of configuration information of the medical equipment, where the table of configuration information includes the configuration information of each of the system configurations of the medical equipment;

a calculating module 96, configured to calculate the upgrading identification corresponding to each of the system configurations; and a second generating module 97, configured to generate a table of system configuration according to the table of configuration information and the upgrading identifications, where the table of system configuration used to generate the software upgrading package and to indicate the system configuration corresponding to each of all the upgrading identifications.

In an example, the calculating module 96 may comprise a forming unit 961 and a calculating unit 962.

The forming unit 961 is configured to, for each of the system configurations, connect the product code of each of the hardware components and the name and version of each of the software modules in the system configuration in a pre-set order to form a string, where the product code corresponds to the model of each of the hardware components.

The calculating unit 962 is configured to calculate the hash value of the string and the hash value is used as an upgrading identification of the system configuration.

Figure 12:
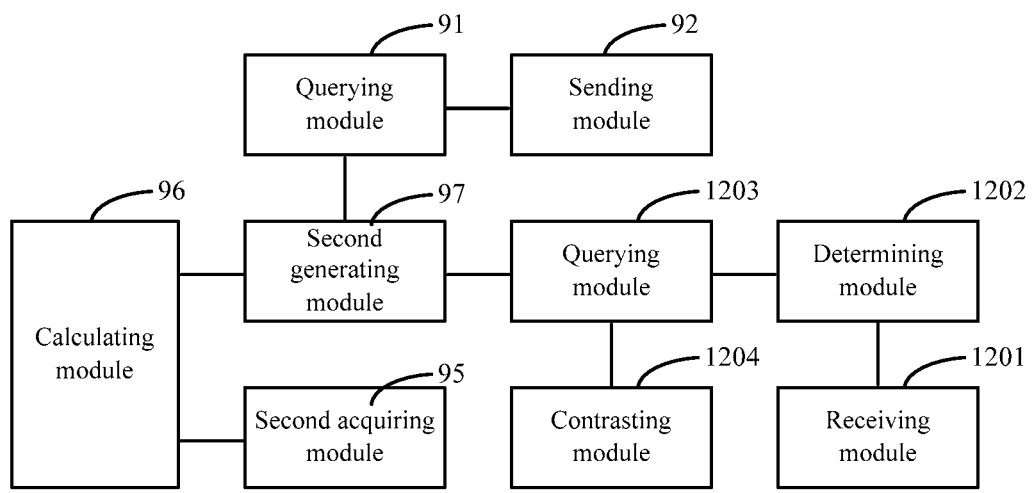
FIG. 12 is a block diagram illustrating a structure of the first data processing control logic in yet another example of the present disclosure.

In one example, referring to FIG. 12, the upgrading identification file may also include timestamps; the table of upgrading identifications may further include association between the timestamps, the upgrading identifications and the equipment numbers. The server may further include a receiving module 1201, a determining module 1202, a querying module 1203 and a contrasting module 1204.

The receiving module 1201 may be configured to receive a query request for transition history of system configuration of the second target medical equipment to be queried, and determine the second target equipment number corresponding to the second target medical equipment according to the query request.

The determining module 1202 may be configured to determine the upgrading identification and the timestamp corresponding to each of the second target equipment numbers according to the association between the timestamps, the upgrading identifications and the equipment numbers when there is a plurality of second target equipment numbers in the table of upgrading identifications.

The querying module 1203 may be configured to query the table of system configuration and determine the system configuration corresponding to the upgrading identification in association with each of the second target equipment numbers.

The comparing module 1204 may be configured to compare the system configurations corresponding to each of the timestamps respectively to acquire the information about transition history of system configuration of the second target medical equipment corresponding to the second target equipment numbers.

Figure 13:
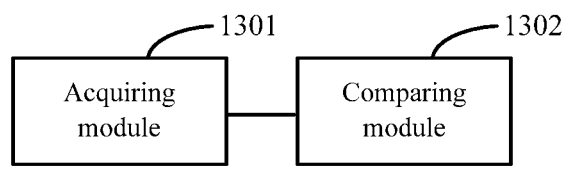
FIG. 13 is a block diagram illustrating a structure of a second data processing control logic in an example of the present disclosure.

Referring to the example in FIG. 13, the control logic for second data processing in the medical equipment may comprise, in terms of functionality, an acquiring module 1301 and a comparing module 1302.

The acquiring module 1301 may be configured to acquire the first target upgrading identification(s) carried in the upgrading package to be unpacked.

The comparing module 1302 may be configured to compare the first target upgrading identification(s) with a second target upgrading identification corresponding to the system configuration of the medical equipment, and if the second target upgrading identification is consistent with any of the first target upgrading identification(s), unpack the software installation package to upgrade the medical equipment.

Figure 14:
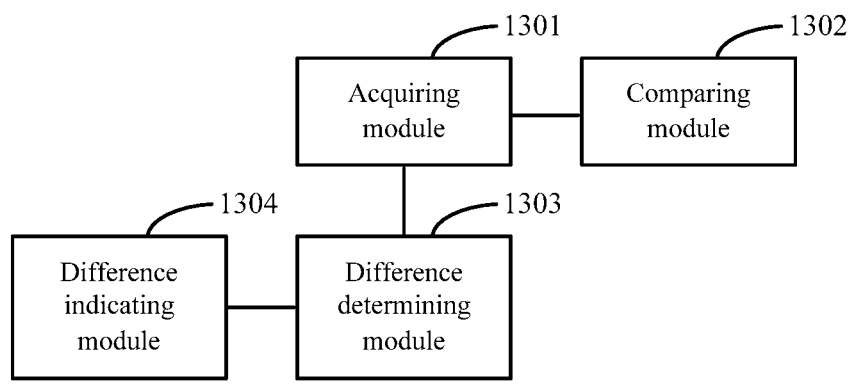
FIG. 14 is a block diagram illustrating a structure of the second data processing control logic in another example of the present disclosure.

In an example, as shown in FIG. 14, the control logic may further include:

a difference determining module 1303, configured to acquire difference information about the difference between the system configuration corresponding to each of the first target upgrading identification(s) and the system configuration corresponding to the second target upgrading identification; and a difference indicating module 1304, configured to indicate the difference information to the user when the unpacking of the software upgrading package is rejected.

If the above functions are implemented in the form of software functional units and sold or used as an independent product, they may be stored in a computer readable storage medium. Based on such understanding, the technical solution of the present disclosure or the part(s) contributing to the prior art or the part(s) of the technical solution may be embodied in the form of software product, and the software product may be stored in a storage medium including instructions to enable a computer device (including personal computer (PC), server or network device, etc) to implement part or all the blocks of the method of each of the examples of the present disclosure. The above-mentioned storage medium may include U disk, mobile hard disk, read-only memory (ROM), random access memory (RAM), magnetic disk or optic disk and other types of storage medium which can store program code.

The above are only preferred examples of the present disclosure is not intended to limit the disclosure within the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for upgrading a on-line upgrade medical equipment, comprises:

generating, by a server, a table of configuration information of the medical equipment, the table of configuration information comprising the configuration information for all of different system configurations of the medical equipment;

calculating, by the server, an upgrading identification corresponding to each of the different system configurations;

generating, by the server, a table of system configuration according to the table of configuration information and upgrading identifications, the table of system configuration comprising the system configurations and the respective upgrading identifications and being used to generate a software upgrading package and indicate the system configuration corresponding to each of all the upgrading identifications;

acquiring, by the server, an upgrading identification file of the medical equipment, the upgrading identification file comprising timestamps, the upgrading identification and an equipment number of the medical equipment; and generating, by the server, a table of upgrading identifications according to the upgrading identification file, the table of upgrading identifications comprising association between the timestamps, the upgrading identifications and the equipment number of the medical equipment;

querying, by the server, the table of upgrading identifications according to a first target upgrading identification in a generated software upgrading package to determine a first target equipment number corresponding to the first target upgrading identification; and sending, by the server, the generated software upgrading package to a first target medical equipment corresponding to the first target equipment number to facilitate the first target medical equipment to upgrade itself according to the generated software upgrading package;

wherein the method further comprises:

receiving, by the server, a query request for transition history of system configuration of a second target medical equipment;

determining, by the server, a second target equipment number corresponding to the second target medical equipment according to the query request;

when there is a plurality of second target equipment numbers in the table of upgrading identifications, determining, by the server, the upgrading identification and the timestamp corresponding to each of the second target equipment numbers according to the association between the timestamps, the upgrading identifications and the equipment numbers;

querying, by the server, the table of system configurations to determine the system configuration corresponding to the upgrading identification in association with each of the second target equipment numbers; and comparing, by the server, the system configurations corresponding to each of the timestamps respectively to acquire the information about transition history of system configuration of the second target medical equipment corresponding to the second target equipment numbers.

2. The method of claim 1, wherein
the first target upgrading identification is used to identify the system configuration of the medical equipment to which the software upgrading package is applied, and
an upgrading identification in the table of upgrading identifications is used to identify the system configuration of the medical equipment.

3. The method of claim 1, wherein,
each of the system configurations comprises information about a plurality of hardware components and information about a plurality of software modules; and
calculating the upgrading identification of each of the system configurations comprises:
for each of the system configurations, connecting, by the server, the product code of each of the hardware components and the name and version of each of the software modules in the system configuration in a preset order to form a string, the product code corresponding to the model of the each of the hardware components; and
calculating, by the server, the hash value of the string as the upgrading identification of the system configuration.

4. A server, comprising a processor configured to execute machine readable instructions corresponding to a control logic for first data processing in storage medium, the machine-readable instructions, when executed by the processor, cause the processor to:
generate a table of configuration information of the medical equipment, the table of configuration information comprising the configuration information for all of different system configurations of the medical equipment;
calculate an upgrading identification corresponding to each of the different system configurations;
generate a table of system configuration according to the table of configuration information and upgrading identifications, the table of system configuration comprising the system configurations and the respective upgrading identifications and being used to generate a software upgrading package and indicate the system configuration corresponding to each of all the upgrading identifications;
acquire an upgrading identification file of the medical equipment, the upgrading identification file comprising timestamps, the upgrading identification and an equipment number of the medical equipment; and
generate a table of upgrading identifications according to the upgrading identification file, the table of upgrading identifications comprising association between the timestamps, the upgrading identifications and the equipment number of the medical equipment;
query the table of upgrading identifications according to a first target upgrading identification in a generated software upgrading package to determine a first target equipment number corresponding to the first target upgrading identification; and
send the generated software upgrading package to a first target medical equipment corresponding to the first target equipment number so as to allow the first target medical equipment to upgrade itself according to the generated software upgrading package;
wherein the machine readable instructions further cause the processor to:
receive a query request for transition history of system configuration of a second target medical equipment, and determine a second target equipment number corresponding to the second target medical equipment according to the query request;
when there is a plurality of second target equipment numbers in the table of upgrading identifications, determine the upgrading identification and timestamp corresponding to each of the second target equipment numbers according to the association between the timestamps, the upgrading identifications and the equipment numbers;
query the table of system configurations and determine the system configuration corresponding to the upgrading identification in association with each of the second target equipment numbers; and
compare the system configurations corresponding to each of the timestamps respectively to acquire information about transition history of system configuration of the second target medical equipment corresponding to the second target equipment numbers.

5. The server of claim 4, wherein
the first target upgrading identification is used to identify the system configuration of the medical equipment to which the software upgrading package is applied, and
an upgrading identification in the table of upgrading identifications is used to identify the system configuration of the medical equipment.

6. The server of claim 4, wherein,
each of the system configurations comprises information about a plurality of hardware components and information about a plurality of software modules, and
the machine readable instructions further cause the processor to:
for each of the system configurations, connect the product code of each of the hardware components and the name and version of each of the software modules in a preset order to form a string, the product code corresponding to the model of each of the hardware components; and
calculate the hash value of the string as an upgrading identification of the system configuration.

* * * * *